L. J. HIRT.
COMPENSATING BEARING.
APPLICATION FILED JULY 16, 1919.
1,375,697.
Patented Apr. 26, 1921.
2 SHEETS—SHEET 2.
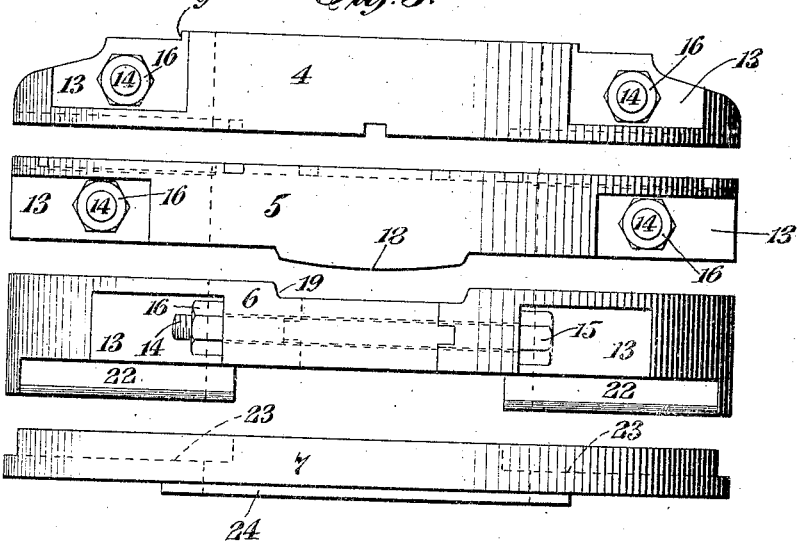
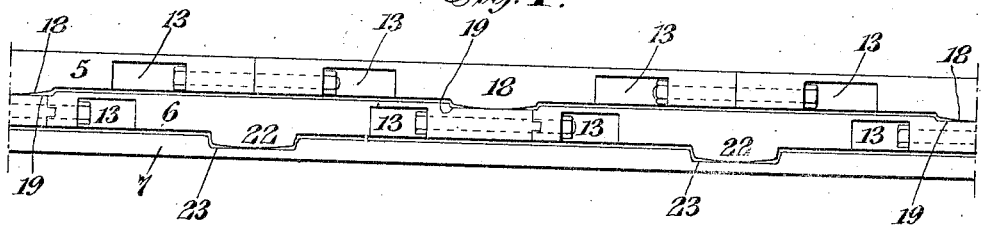
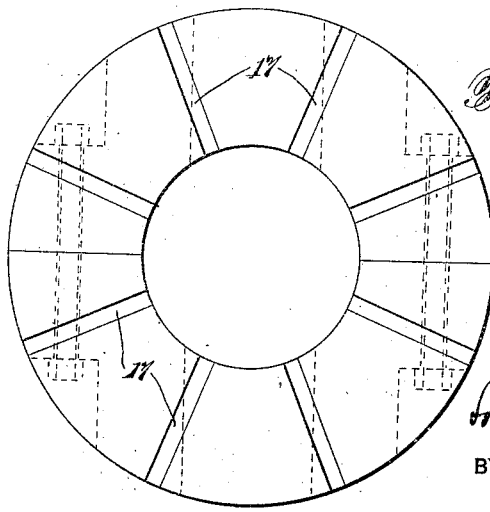
ATTORNEY

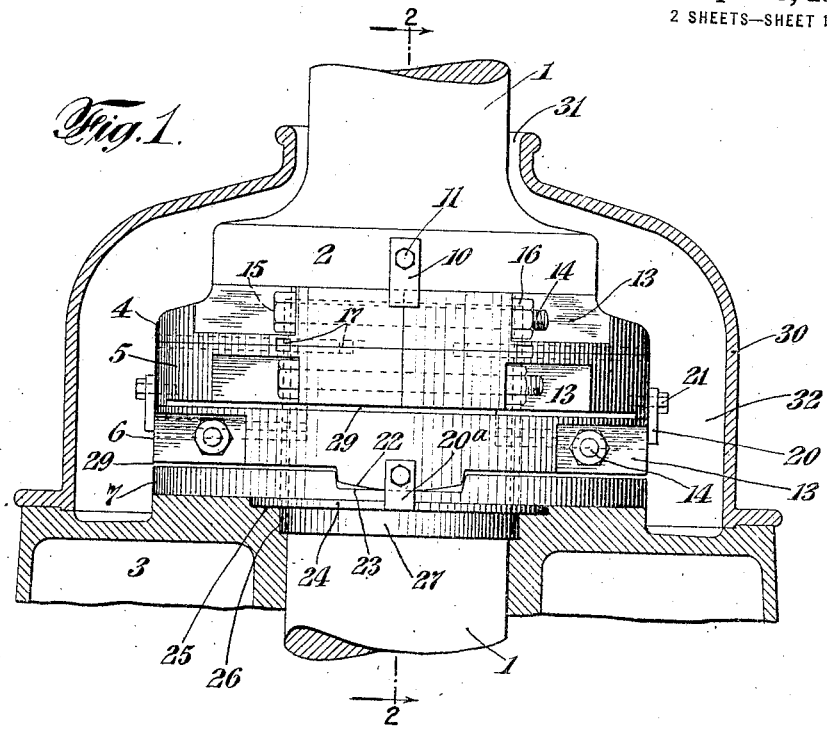

UNITED STATES PATENT OFFICE.

LOUIS JOSEPH HIRT, OF YONKERS, NEW YORK.

COMPENSATING BEARING.

1,375,697.	Specification of Letters Patent.	Patented Apr. 26, 1921.

Application filed July 16, 1919. Serial No. 311,118.

*To all whom it may concern:*

Be it known that I, LOUIS JOSEPH HIRT, a citizen of the United States, residing at Yonkers, in the county of Westchester and State of New York, have invented certain new and useful Improvements in Compensating Bearings, of which the following is a specification.

This invention relates to compensating or universal bearings, and its main object is to produce such a type of bearing in combination with a shaft as will facilitate alinement of the shaft with its other bearings in case of their disarrangement, as for example in the sinking of foundations or sagging of structural members or work from their normal position or positions requisite for maintenance of a shaft in alinement with all its bearings. My present invention is useful in various kinds of installations such for example as the installations of steam turbines.

In the accompanying drawings forming a part hereof and illustrating the principle of this invention in the best mode now known to me of applying that principle, Figure 1 is a vertical central section of a compensating or universal bearing embodying this invention.

Fig. 2 is a vertical central section thereof at line 2—2 of Fig. 1, being at right-angles to the section shown in Fig. 1.

Fig. 3 shows in edge view four bearing rings in position for flatwise superimposition one on another in a pile, the two rings between the top ring and the bottom ring being constructed for a diametrically sidewise rocking or tilting movement at right-angles one to another, and all four rings for better illustration being shown spaced apart and consequently out of working position. The top ring and the two intermediate rings are also shown of split ring construction.

Fig. 4 shows in assemblage a layout in plan of the peripheries of the bottom and two intermediate rings shown in Fig. 3, this view further illustrating the split ring construction referred to and the construction by which the sidewise diametric tilting or rocking movements of the two intermediate rings are effected.

Fig. 5 is a plan of the flat face of a ring which may be considered either as the under face of the top ring shown in Fig. 3 or as the top face of the uppermost rockable ring shown in Fig. 3, this view being intended for a somewhat diagrammatic view of the position of superimposed and complementary radial oil ducts formed in the opposed and contacting faces of said top ring and of the uppermost ring when they are in working position.

Referring to that form of the invention now shown, the vertical shaft 1 is provided with an upper, integral flange 2, spaced apart from an under stationary bearing 3, four superimposed rings 4, 5, 6 and 7 being located between flange 2 and the stationary bearing 3. These four rings, of which rings 4, 5 and 6 are shown as split rings, constitute superimposed intermediate bearing members between the shaft flange and the stationary bearing, and their bores, shown of equal diameters, are severally of greater diameter than the diameter of the shaft. Ring 5 is constructed to rock on the upper surface of the next lower ring 6, and the latter is constructed to rock on the bottom ring 7 of said series of four intermediate bearing members, the rocking movements of said rockable rings being at right angles one to the other, whereby a universal bearing is obtained. The said rockable rings of which two are shown, that is the rings 6 and 7, are rockable on their transverse diametric axes, and each ring is rockable sidewise through planes or fields at right-angles to the lengthwise axis of the shaft that is provided with my new bearing.

As shown, the bottom of shaft flange 2 has an annular central recess 8, concentric with the shaft for reception of an upstanding circular boss 9 on the upper surface of ring 4, which is the uppermost of said series of four intermediate bearing members; the opposed surfaces of the shaft flange 2 and ring 4 in assemblage contact one with the other, and the shaft flange is provided with a pair of dependent tongues 10, one diametrically opposite the other, each being held to the shaft flange by a screw 11 and having its lower end socketed in a peripheral recess at 12 in the periphery of the underlying ring 4. By the described construction, ring 4 is kept centered with the shaft flange and shaft, owing to the projection of boss 9 into the recess 8. The tongues 10 in recesses 12 keep the ring 4 from rotational movement. The split ring construction is the same in each ring 4, 5 and 6, each having peripheral recesses 13 for reception of the ends of through-bolts 14, the heads 15 and nuts 16 of which lie in the recesses.

For lubrication purposes, the opposed walls of rings 4 and 5 are formed with a series of opposed radial oil channels 17, as indicated in Figs. 1, 2 and 5, an end of each set of opposed channels that form one oil duct opening into the bores of the rings 4 and 5, and the outward end of each such set of channels opening into the peripheral walls of said rings. The rings 4, 5, 6 and 7 are shown of equal interior and exterior diameters.

To accomplish the rocking movements referred to, the under wall of ring 5 is provided with diametrically opposed downwardly projecting rocker lugs 18, one at each side of the bore and each of a length corresponding to the width of the ring from the wall of its bore to its peripheral wall, and each rocker lug 18 fitting rockably in a corresponding recess 19 in the upper wall of ring 6. Ring 5 is formed with dependent tongues 20 affixed to its periphery by a screw 21 and having its inner end overlapping and bearing against the periphery of the ring 6 to restrain the rings 5 and 6 from sliding movement.

The under side of ring 6 is formed with diametrically opposed downwardly projecting rocker lugs 22 corresponding to the rocker lugs 18 and each being rockably mounted in a recess 23 in the upper wall of ring 7; the rocker lugs 18 and their receiving recesses 19 being at right angles to the rocker lugs 22 and their receiving recesses 23.

The under side of bottom ring 7 is formed with a dependent annular boss 24 seated in a corresponding recess 25 in the upper face of the stationary bearing 3, the bore of which is annularly recessed at 26 in its upper wall to form a seat for the under end of an upstanding tubular sleeve 27 of slightly larger interior diameter than that of the shaft, in order to form a clearance between the shaft and the sleeve, the shaft extending upwardly through it and the sleeve being of lesser interior diameter than the diameter of the bores of the rings 4, 5, 6, and 7, in order to form an oil-way at 28 between the opposed walls of said bores and of the sleeve, and also in order to permit slight rocking or tipping movements of the intermediate bearing rings 5 and 6. The rocker lugs are of a vertical depth sufficient to space the adjacent surfaces of the rings from which they project apart from the opposed surfaces of the rings having the rocker lug receiving recesses, in order to form an oil-way 29 between the rings 5 and 6 and also between the rings 6 and 7. The ring 6 is provided with dependent tongues 20ª overlapping and bearing on the periphery of ring 7 in order to prevent sliding movement of these rings relatively one to another.

The upper end of the stationary bearing 3 is of larger diameter than the ring 7 and has mounted on its upper annular margin, an upstanding casing 30, through the open neck 31 of which the shaft extends, forming an annular oil chamber 32 around the intermediate bearing rings. The bearing 3 carries an upstanding lubricant escape pipe 33, the upper end of which is open in chamber 32; the upper end of said sleeve being preferably at a higher level than the upper end of the escape pipe 33 which is shown in Fig. 2 flush with the oil level.

The casing is provided with a window 34 and with a cover 35 for a hand hole 36, each being for convenience in observation of interior conditions, and for cleaning purposes. The casing is also provided with an oil intake port into which the lubricant supply nozzle 37 extends.

What I claim is:

1. The combination with a shaft provided with a bearing flange and a bearing member spaced apart from said flange of a plurality of intermediate bearing members, one of which is diametrically and sidewise rockable on another, and another of which is diametrically and sidewise rockable, at right angles to such rocking movement, on another bearing member; said bearing members severally having opposed surfaces which are opposedly flat except where in rocking contact one with another, and comprising opposed rocking surfaces formed by interworking rocker lugs projecting from a flat surface and by rocker-lug receiving recesses reëntrant in a flat surface, the rocker lugs and their receiving recesses being dimensioned to space the opposed flat surfaces of the members apart when they are parallel one to another.

2. In the combination set forth in claim 1, means to restrain edgewise movements of the intermediate bearing members relatively to the axis of the shaft.

3. In the combination set forth in claim 1, means to restrain rotational movements of the intermediate bearing members, the same being out of contact with the shaft.

4. In the combination set forth in claim 1, a casing mounted on that bearing member which is spaced apart from the shaft flange; the casing having an intake for lubricant and surrounding the intermediate bearing members, said first mentioned bearing member carrying a lubricant escape pipe, and also carrying a sleeve through which the shaft loosely passes; the intermediate bearing members being superimposed rings and the sleeve extending through the bores thereof with an oil space between the periphery of the sleeve and the walls of the bores, and said superimposed bearing members being constructed with oil spaces between them.

5. In the combination set forth in claim 1, the shaft flange being integral with the shaft; the bearing which is spaced apart therefrom being a stationary bearing and the intermediate bearing members comprising a plurality of split rings one of which is formed on one side with diametrically alined rocking lugs, one at each side of the bore; the next adjacent member being a split ring having diametrically alined recesses one at each side of its bore, and each receiving one of said rocker lugs, and also having on its other surface diametrically alined rocker lugs; and an adjacent bearing ring provided with diametrically alined rocker lug receiving recesses, each for reception of one of the last mentioned rocker lugs.

In testimony whereof I have hereunto set my hand this 15th day of July, 1919.

LOUIS JOSEPH HIRT.